United States Patent Office 3,098,696
Patented July 23, 1963

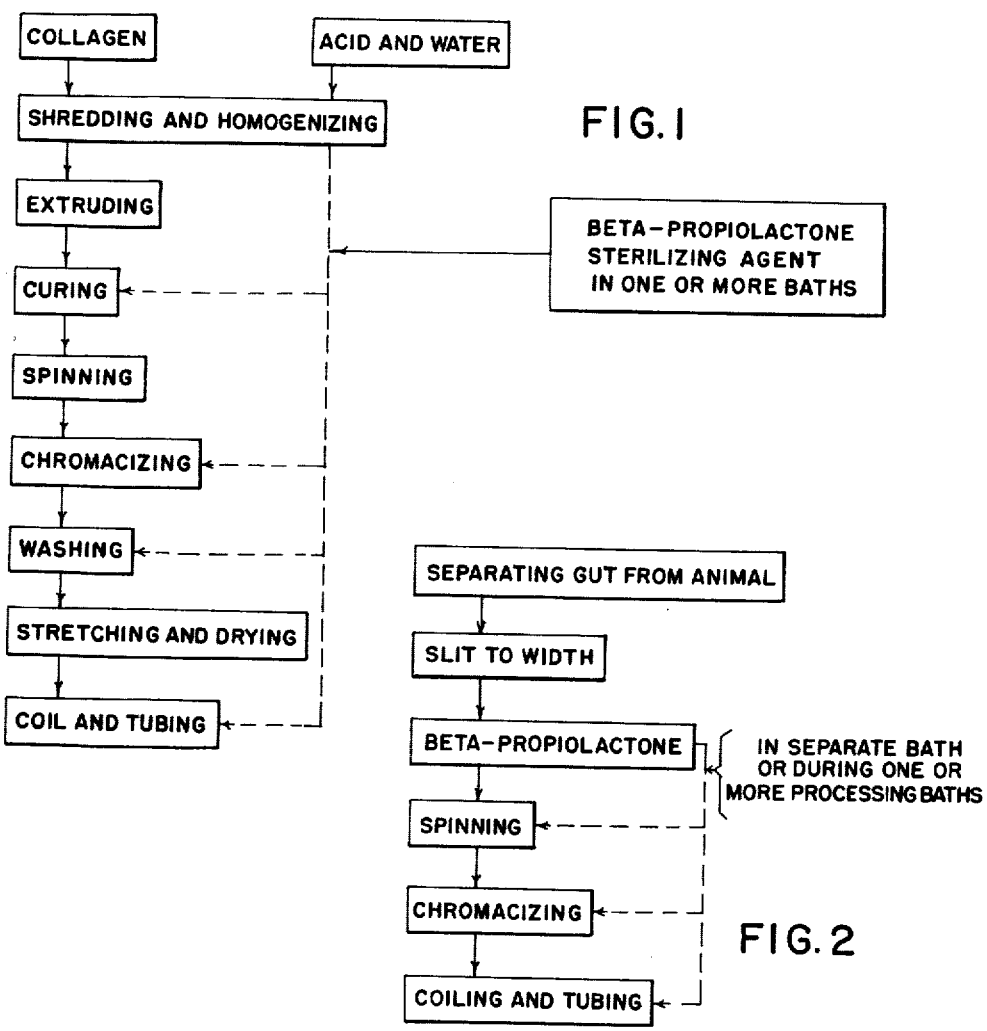
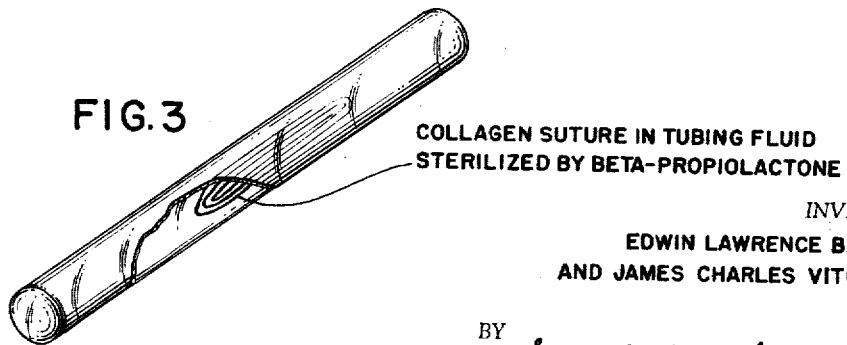
FIG. 3 COLLAGEN SUTURE IN TUBING FLUID STERILIZED BY BETA-PROPIOLACTONE
INVENTORS
EDWIN LAWRENCE BALL
AND JAMES CHARLES VITUCCI
BY
ATTORNEY

3,098,696
MANUFACTURE OF STERILE SURGICAL
SUTURE COLLAGEN
Edwin Lawrence Ball, Nanuet, and James Charles Vitucci, Pearl River, N.Y., assignors to American Cyanamid Company, New York, N.Y., a corporation of Maine
Filed Aug. 18, 1959, Ser. No. 834,373
8 Claims. (Cl. 18—54)

This invention relates to a method of sterilizing the collagen of surgical sutures by contacting the collagen during one or more stages of manufacture with beta-propiolactone in the presence of at least some water. More particularly, this invention relates to destroying contamination in the material from which the sutures are to be prepared, or in the final suture in prepared form, or in an intermediate stage, and includes sutures from animal tissues, both those which are made by cutting the tissue to shape and those which are made by regenerating the collagen as part of a spinning procedure, and as such includes both natural and regenerated collagen sutures which may be tanned, untanned, or otherwise treated, and which may have needles attached.

Beta-propiolactone may be used to sterilize sutures of other materials including silk, linen, cotton, nylon, polyester, polyethylene, polypropylene, polyacrylonitrile, or stainless steel or other metal suitable for sutures.

As used herein, the term "suture" is used to include ligatures. Sometimes a distinction is made in that a strand used for sewing is called a suture, and a strand used for tying is called a ligature. Inasmuch as different portions of a single length of suture may be used for both purposes, the single term suture is used hereinafter in the generic sense to include both.

Collagen is an animal protein which is found in the hides and fibers of animals. One good source is the Achilles' tendon. It is also found as certain layers of the intestinal tissues of animals. Collagen is particularly useful as a suture material because it causes very little irritation when inserted into other tissues, and because it is absorbed in the body of the subject as the protein succumbs to the attack of proteolytic enzymes. The suture of collagen is dissolved and removed from the surgical field. The rate of absorption may be controlled by tanning as for example chrome tanning, so that sutures may be prepared which have an absorption rate which is desired by a surgeon or veterinarian for a particular site.

At present, most sutures are prepared from the intestinal tissues of sheep or beef by separating particular layers having the desired characteristics, slitting these layers into ribbons, twisting into strings of desired diameters, tanning as desired, and cutting to length. The strings may be ground or otherwise precision shaped and may be treated with plasticizing agents to control their handling characteristics. Such sutures are hereinafter referred to as gut sutures.

Sutures may also be produced by dispersing collagen and spinning the dispersed collagen into a ribbon as it is regenerated and then twisting, stretching, and otherwise treating the regenerated ribbon to give sutures with the desired characeristics. Such sutures are hereinafter referred to as regenerated collagen sutures, independent of the source of the collagen. Tendons such as the Achilles tendons of beef are usually used as the raw material, although other sources, even the intestinal tissues may be used.

Inasmuch as the collagen for either the slit ribbon or the regenerated strands is obtained from animal sources, it is predictable that the collagen is contaminated. For sutures manufactured from gut tissues, a high degree of contamination is to be expected because of the adjacent intestinal contents. Sometimes by careful handling, tendons may be used as a source material which have a relatively lower degree of contamination.

Because of the extremely high incidence of contamination of the starting materials, it is normally customary to not pay too much attention to additional contamination during the initial stages of manufacture.

At some stage of manufacture, sterilization becomes necessary. In the past, sutures have been usually sterilized by heating near the end of the manufacturing process. Collagen is adversely affected by overheating and accordingly, it has been necessary to use provisions to minimize the loss of the strength during sterilizing procedure. One method has been to dry the suture string so that there is very little moisture present during a heat sterilization cycle. This minimizes deterioration of the collagen comprising the suture, but, by the same token, requires a preliminary drying step and also rehydration to attain the desired plasticity in the final suture.

One common method of sterilization involves the use of chemical agents. Phenol and formaldehyde are probably the best known chemical sterilizing agents. Collagen sutures, either gut or regenerated, treated with either in fact become sterile; but both formaldehyde and phenol affect the collagen itself by denaturing or coagulating the collagen, so that the desired characteristics are deleteriously modified and also an undesirable residue of the chemical remains in the finished product. Most commercial chemical sterilizing agents so deleteriously affect the collagen of the suture that the sutures are no longer useful.

Some of these sterilizing procedures, including heat, may cause a loss in strength of the finished suture and a deterioration in its desirable properties.

For use as a suture, it is desirable that the strand be as strong as is possible. This strength is tested first by a straight pull, to determine tensile strength, and secondly, by knot-pull in which the tensile strength is determined with a knot tied in the suture. For stiff sutures, the knot-pull strength can be less than half of the straight-pull strength.

Additionally, the suture must be comparatively flexible as is shown by the properties of flexing, and its "run down." The "run down" of a suture can be observed by making a single turn of the suture about itself so that half of a square knot is formed near the ends of the suture and then running that half of a square knot down to the wound surface, or a test surface. The other half of the square knot is formed and run down also. For acceptability to the surgeon or veterinarian, the knot must run down smoothly, without fraying in the suture. A stiff suture generally displays poor handling properties. The flex of the suture as it runs around the adjacent strand is a good test for flexibility.

If two turns are taken about the adjacent strand to form half a surgeon's knot the problem of flexibility becomes even more critical. It is highly desirable that the suture be sufficiently flexible so that a surgeon's knot can be easily tied and run down. A surgeon's knot is less apt to slip than a square knot. In tying packages, the average person will tie one-half of the square knot, and have to have an assistant "put his finger on the knot" while the second half of the knot is tied. The use of a surgeon's knot obviates at least part of the trouble with many strings.

It has now been found that the collagen of the surgical suture may be sterilized by contact with beta-propiolactone in the presence of water. Beta-propiolactone is a colorless liquid slightly heavier than water with a pungent acrylic odor. Its boiling point is above 162° C. so that it is normally more convenient to use it in the liquid phase rather than as a vapor phase sterilizing agent. For the present purposes, the beta-propiolactone is dissolved in water or a water miscible lower alcohol such as methanol, ethanol, propanol, isopropanol or tertiary butanol or other water miscible oxygenated organic solvent including ketones, such as acetone, glycols, such as ethylene glycol, alkoxy alkanols, such as beta methoxy ethanol, etc, or mixtures thereof. Such solvent should either be volatile, or well washed out with water. Ethanol and the propanols and mixtures thereof, preferably containing at least somewater, give excellent results. Soluble salts may be present without deleteriously affecting the sterilizing efficacy of the beta-propiolactone. Such salts are normally not required for sterilization but may be present for other effects. For example, ammonia or other volatile alkali, may be present in the spinning baths, or compounds of chromium in chromicizing baths, etc. The conjoint use of beta-propiolactone and such compounds permits the concurrent sterilization and other manufacturing operation.

Beta-propiolactone gives excellent results in the processing of gut sutures, and may be used in any of some several of the processing baths.

Gut may be adversely affected by bacterial action during the period between harvesting and the completion of the suture. By treating the harvested gut with beta-propiolactone immediately, any deleterious action is prevented.

Beta-propiolactone is particularly convenient for the sterilization of regenerated collagen sutures in processing by using a time and concentration which is sufficient to completely sterilize the collagen before spinning. Such operations as spinning, chromicizing, sizing, cutting to length, attaching needles, etc. may conveniently be accomplised using conventional clean but non-sterile techniques. Only the outer surface of the suture becomes contaminated in such process. The outside surface may again be sterilized with beta-propiolactone as a final operation just before packing, or beta-propiolactone may be added to the packaging fluid and final sterilization be accomplished inside of the final package.

The presence of beta-propiolacetone has no deleterious effects on either conventional tubing liquid or jar liquid. Additionally, in the concentrations used for such sterilization the beta-propiolactone decomposes over a period of several days so that after sterilization is complete, there is no residual beta-propiolacetone which could serve as an irritant to the tissue, during the use of the suture or to operating room personnel during use of the suture. The storage time in conventional merchandising operations is much longer than the decomposition period of the dilute beta-propiolactone. The decomposition products of beta-propiolactone are innocuous in any of the systems used with sutures.

In a pure state, beta-propiolactone is a colorless fairly stable liquid, specific gravity 1.146. It is the simplest lactone, being an internal ester of beta-hydroxy propionic acid. There is some tendency to polymerization, which is accelerated by heat. Under refrigeration, beta-propiolactone is stable enough to not loose sterilizing activity for at least a year. Beta-propiolactone hydrolyzes in water, and the rate of hydrolysis is accelerated by the presence of inorganic salts.

For convenience, the beta-propiolactone is conveniently stored in a refrigerator, and once a bottle is opened, and hence may have picked up some water, storage is more convenient near the freezing point of the beta-propiolactone, about −34° C. It may be measured and added at this temperature. From freshly opened containers, the beta-propiolactone may be equally conveniently used and added to sterilizing systems at room temperature.

The concentrations of beta-propiolactone required for sterilization vary depending upon the solvent, and to some extent the degree of contamination, and the nature of the contaminating organisms, as well as temperature, etc. Sterilization may be accomplished at room temperature or may be accomplished near 0° C. Temperatures at least as high as 37° C. are useful because the more rapid decomposition of the beta-propiolactone is compensated by the more rapid attack on contaminating organisms.

More concentrated solutions of beta-propiolactone are normally useful in systems in which the suture is preformed so that the beta-propiolactone has to penetrate through an appreciable path to sterilize the center portion of the string. The concentration use in a precipitating bath or a spinning bath or in a gel composition before spinning may be as low as 0.025% beta-propiolactone on a volume for volume basis in predominantly aqueous systems. Concentrations as high as 5% beta-propiolactone are useful and do not deleteriously affect either the suture nor those using the suture although usually a lower concentration is sufficiently effective to accomplish complete sterilization more economically.

Clearly illustrating certain specific embodiments of the present invention and by way of illustration, but not limitation, the following examples and FIGURES 1 and 2 of the drawings show certain operating embodiments.

FIGURE 3 of the drawings is illustrative of the coiled and tubed beta-propiolactone sterilized collagen suture of the present invention.

EXAMPLE 1

*Treatment of Serosa From Beef Gut*

Beef gut consisting of the small intestine of beef, or export beef round, is separated from the remainder of the animal, the ruffle fat cut away, and the intact gut stripped to remove its contents. The stripped gut is packed in ice within fifteen minutes from the time the animals are slaughtered and kept in ice until ready for further processing. The portion of the serosa to be used in manufacturing the suture is separated from the remainder of the gut in accordance with conventional practice. This portion of the beef gut is sometimes called gold beaters' skin. Portions of the serosa averaging 1¼" by 2" are transferred to sterile cotton-plugged test tubes. The portion of the test tubes above the serosa is sterilized with heat before adding beta-propiolactone solution, to be certain that contamination on the glass walls of the test tube does not affect the results. Beta-propiolactone solution is prepared adding beta-propiolactone chilled to about −33° C. to water at 0° C. 10 milliliters of water containing beta-propiolactone is transferred to each test tube and held overnight before being submitted for assay.

After holding overnight at room temperature the samples of serosa are transferred aseptically to a fluid thioglycollate culture medium and incubated at 37° C. Each test is made in triplicate. The results obtained in a typical run were as follows:

TABLE 1

*Microbiological Assays on Beef Serosa Treated With Beta-Propiolactone in Water Solutions*

| Concentration of beta-propiolactone | Bacterial growth observed in thioglycollate assay broth |
|---|---|
| None | Heavy growth in all three replicates in 24 hours. |
| 0.1% | No growth within 18 days. |
| 0.25% | Do. |
| 0.5% | Do. |
| 1.0% | Do. |
| 2.5% | Do. |
| 5.0% | Do. |

EXAMPLE 2

*Treatment of Serosa Suture Strands*

The sterilization of finished suture strands is readily accomplished by the use of beta-propiolactone. Samples of plain, unchromed surgical gut twisted from beef serosa in accordance with conventional practice may be sterilized by adding beta-propiolactone to the tubing fluid in which the gut sutures are normally stored.

Samples of sutures, completed except for sterilization and tubing, and after grinding to a size of 0.0225" are selected and cut to length. The sutures, of a length convenient for use in the operating room, usually about 54", are coiled in small coils and tied with silk thread for convenience in handling. The coils are inserted in suture tubes, which tubes are flamed above the level at which the sterilizing liquid will stand to kill any micro-organisms which might have lodged on the tube when the samples were inserted. A conventional tubing fluid containing about 94½% ethanol, 5% water and ½% benzene is added to each tube. Beta-propiolactone is added at the specified level to the tubing fluid just prior to addition to the sutures. Nine suture samples are treated at each concentration level of beta-propiolactone. Three samples are incubated for eighteen hours at each of 4° C., 23° C., and 37° C. The treated strands are then transferred aseptically to sterile fluid thioglycollate medium in test tubes and incubated at 37° C. for 26 days, the growth being observed periodically.

No difference in effect could be seen attributable to the differences in the initial treatment temperature and accordingly, the samples from all three temperature levels are grouped together to give nine replicates for each treatment level of beta-propiolactone. The results obtained in a typical run were as follows:

TABLE 2

*Microbiological Assays on Completed Sutures Treated With Beta-Propiolactone in Ethanolic Tubing Fluid*

| Concentration of beta-propiolactone in tubing fluid | Bacterial growth observed in thioglycollate assay broth |
| --- | --- |
| None | Heavy growth in all nine replicates in 1 to 20 days. |
| 0.5% | Heavy growth in eight of nine replicates in 2 to 23 days. |
| 1.0% | Moderate to heavy growth in four of nine replicates in 16 to 23 days. |
| 2.0% | No growth in any of nine replicates in 26 days. |
| 4.0% | No growth in any of nine replicates in 26 days. |

From this it can be seen that surgical suture strands already for tubing as completed sutures, except for sterilization, can be sterilized by using an alcoholic tubing fluid containing beta-propiolactone at a level of about 2%. The use of such tubing fluid permits the completion and sealing of the sutures with the sterilizing step eliminated. The normal storage period for sutures between the time of manufacture and the time of sale is sufficient for beta-propiolactone to sterilize the sutures completely and the excess beta-propiolactone to decompose to innocuous products.

The tubing fluid contains about 94½% ethanol and about 5% water with about ½% benzene added as a denaturant. For tax purposes, such denatured alcohol is preferred in the United States. Where tax laws do not require the use of benzene, ethanol containing water may be used as the tubing fluid, with the addition of a sterilizing quantity of beta-propiolactone.

Substantially duplicate results are obtained using a tubing fluid containing 60 to 65% isopropanol, 37% to 27% ethanol and 3% to 8% water.

The amount of water present in the alcohol may be varied over a range sufficient to give the desired degree of hydration to the gut suture, in accordance with conventional practice. The degree of hydration affects the swell and flexibility of the tubed suture.

Whereas in this example for purposes of convenience in handling glass tubes are used, envelopes of any of the types acceptable for completed sutures may be used as the containers. An envelope of a laminate of a polyester film and a polyethylene film is particularly satisfactory. Needles may be attached to the suture where the completed needled suture is preferred by the medical profession. Chromicized gut may be treated in the same fashion; either needled or unneedled chromicized gut is preferred in many operative techniques because of the reduced rate of attack on the suture.

The sutures thus sterilized by beta-propiolactone are found to have excellent knot-pull, straight pull, and run down characteristics, which have not been adversely affected by the sterilizing process.

EXAMPLE 3

*Treatment of Collagen Gel*

Beef tendon from the Achilles' tendon of mature beef is shredded by passing through a homogenizing mill, care being taken to avoid overheating of the tendon. It is preferred that temperature be kept to less than about 37° C., normal body temperature. Methods of shredding and certain methods of regenerating a collagen fiber from the disintegrated mass are described in U.S. patent to Braun and Braun, 2,747,228, March 29, 1956, "Production of Collagen Strands." 0.5%, based on the volume of the finished gel, of beta-propiolactone, on a volume to volume basis, is added to the shredded tendon and the mixture is then given additional passes through the homogenizing mill to insure even distribution of the beta-propiolactone throughout the mix. The mixture is allowed to stand at laboratory temperature for several hours during which considerable swelling of the collagen occurs. The mixture is then acidified with hydrochloric acid to a pH of about 3.5 and water added to give 0.9% collagen solids while maintaining the pH at 3.5. The collagen mass becomes swollen and is suitable for the manufacture of regenerated collagen sutures using the procedure described in the above Braun patent. Tests with thioglycollate broth shows the shredded beef tendon gel to be free from microbiological life.

By using known procedures, the shredded tendon may be regenerated and formed into sutures using aseptic procedures. Such sutures are found to be sterile.

Commercially, it is usually more convenient to use clean but not sterile procedures with additional beta-propiolactone near the end of the processing cycle so that expensive sterile operations during manufacture may be avoided. The beta-propiolactone is useful in the initial operations to prevent gross contamination and bacterial action which would weaken and degrade the collagen. If clean processing procedures are used and steps taken to avoid gross contamination, the sterilization may be accomplished nearer the end of the process and the consumption of beta-propiolactone thus be reduced. The beta-propiolactone does not appear to reduce the strength or adversely affect handling qualities no matter where used in the process. Sutures produced using beta-propiolactone for sterilization are found to be about 9% stronger in the straight pull and 17% stronger on the knot pull as compared with similar strands heat sterilized at the end of manufacture.

EXAMPLE 4

*Addition of Beta-Propiolactone to Acid Swelled Collagen Gel*

For processing, collagen gels are usually cast at around 0.9% collagen solids. Because such gels are comparatively viscous and thus more difficult to handle certain of these gels were diluted with water to 0.5% total solids for testing sterilizing procedures. Portions of a larger batch of acid swelled collagen gel containing 0.9% collagen solids were diluted to 0.5% collagen solids with water. The collagen has a considerable bacterial population ranging from 20 to 3000 micro-organisms per milliliter of gel. The growth habits of some of the colonies have suggested the presence of Pseudomonas sp., Staphylococcus sp., *Bacillus subtilis*, *Bacillus mesentericus*, and *Flavobacterium* sp.

For test purposes, certain of the gels were additionally seeded with spores of *Bacillus cereus* PCI#213 (American Type Culture Collection #1178) to give a test population of 25,000 organisms per milliliter of gel. Beta-propiolactone concentrations are formed by adding beta-propiolactone on a volume per volume basis of 0.05% to 2.5%. The gel is agitated in a high speed blender while the cool beta-propiolactone is added drop-wise by pipet. The stirring is continued from 2 to 5 minutes and the treated gel is transferred back to the beaker from which the original gel was taken. From this beaker 10–15 milliliters are transferred to sterile cotton-plugged hard glass test tubes. Aliquots are transferred aseptically to fluid thioglycollate broth and the gels cultured at 37° C. for at least 14 days. The fluid thioglycollate broth culture system is more sensitive than the use of regular plate techniques. In typical tests seeded gels specifically contaminated with 25,000 spores per milliliter of the above *Bacillus ceres* were found to have no bacterial growth when treated with 0.2% beta-propiolactone on a volume per volume basis. These tests were run at a collagen solid concentration of 0.75%, 0.60% and 0.50%. The results obtained on an 0.5% collagen solids under a wider range of conditions in which the thioglycollate broth medium was observed for at least 14 days is as shown in the following table:

TABLE 3

*Summary of Microbiological Assays on Acid-Swelled Collagen Gel Treated With Beta-Propiolactone*

| Beta-propiolactone concentration | Native bacterial population; no added known culture | Native bacterial population plus about 25,000 spores of *B. cereus* per ml. of gel |
|---|---|---|
| None | Generally good growth on agar plates within 48 hours; generally heavy growth in broth tubes within 24 hours. | Generally good growth on agar plates within 24 hours; generally heavy growth in broth tubes within 24 hours. |
| 0.05% | No growth on agar plates within 72 hours; no growth in broth tubes seeded with gel containing about 1,000 cells per milliliter. | |
| 0.10% | No growth on agar plates within 72 hours; no growth in broth tubes seeded with gel containing about 1,000 cells per ml.; heavy growth in one of two broth tubes seeded with gel containing 3,000 cells per milliliter. | No growth on agar plates within 48 hours, but some growth within 72 hours; no growth in broth tubes within 24 hours, but heavy growth in broth in tubes within 48 hours. |
| 0.15% | No growth on agar plates; no growth in broth tubes. | No growth on agar plates; no growth in broth tubes. |
| 0.20% | do | Do. |
| 0.25% | | Do. |
| 0.50% | No growth on agar plates; no growth in broth tubes. | Do. |

Physical tests on sutures prepared from these collagen gels showed that for straight-pull, knot-pull, and run down the beta-propiolactone at levels of 0.5%, 1.5% and 2.5% volume per volume on the gel gave no appreciable decrease in the straight pull or knot-pull or run down. In fact, the tests suggested that there may be a slight improvement in properties although the improvement is too small to be statistically significant in a small sample batch.

One process of regenerating collagen for sutures comprises the extrusion of an acid collagen gel at 0.5 to 1.5% solids and a pH of 2.5 to 4.5 into an alkaline alcoholic bath containing not more than 50% water, at any time, the alkanol being a completely water miscible alcohol, or mixtures thereof, and containing at least 0.1% of a volatile alkali, to form a continuous filament which is cured either by remaining in contact with the bath for a sufficient length of time or by re-exposure to alkali after squeezing into a ribbon. The continuous filament is squeezed into a ribbon and then, if necessary, re-exposed to a volatile alkali if it has not previously been cured, after which it is dried preferably below 150° F., and converted into a suture by spinning and stretching, and tanning if desired. The process of our invention involves a number of separate steps. These steps are the extrusion into a continuous filament, the curing of the filament, the squeezing of the filament into a ribbon, the drying of the ribbon, the spinning of said ribbon into a twisted cord, the tanning of the cord in the usual manner of sutures, and the stretching of the suture to effect maximum strength and uniformity and minimum diameter. The step of curing the ribbon may precede or follow the squeezing of the filament into a ribbon. The steps of tanning and stretching can follow the twisting into a cord or they may precede this step, or they may be partially done before and partially after this step.

The collagen can be sterilized at any stage or stages of the process. Conveniently, the collagen is sterilized as the string is formed, and the external surface is again sterilized as finally tubed.

Sterilization in a dispersed phase, or while still wet permits easier and more rapid penetration of the beta-propiolactone. Lower concentrations are thus effective. If the string is internally sterile, the assembly, needling, handling in packing, etc. can be accomplished in a non-sterile fashion. Sterile techniques are generally more expensive. The exterior of the suture is then simply sterilized just before sealing, or by beta-propiolactone in the tubing fluid after sealing.

The term tubing and tubing fluid are used to refer to both glass tubes, and plastic envelopes. For purposes of the present invention, either may be used. The term "tubing fluid" has come to have an accepted meaning in the industry, and is the liquid inside the inner container in contact with the suture.

For internal sterilization, the beta-propiolactone can be used in the gel, the curing bath, the spinning bath, during chroming, or during a separate special bath used exclusively for sterilization, which may be placed at any convenient place in the process.

One illustration of a regenerative procedure, is given in the following example:

EXAMPLE 5

*Forming Regenerated Collagen Sutures*

Beef tendons are separated from the sheaths and fleshy residues, and cut into small pieces. After they have been frozen with Dry Ice the tendon pieces are shredded in a shredding mill, and screened through a No. 4 screen. The shredded material is kept in the frozen state until used. Six hundred grams of frozen shredded tendon, equivalent to 200 grams of tendon solid, is placed in about 9 liters of water containing 500 milliliters of 3 normal hydrochloric acid, that is, enough to give a pH of 2.4 to 3.0. The final volume of the mixture is about 10 liters. The mixture is kneaded with a paddle stirrer for several hours and then allowed to swell overnight cold. The resulting gel is a uniformly swollen mass of tendon material with about 2% solids concentration. 13.5 kilograms of cold water is then added and the resulting mixture is stirred until a uniform consistency is obtained. The dry solid content at this point is about 0.85%. The gel is now passed several times through a colloid mill, reducing the clearance between the stones each time. During this operation, the gel is held below 25° C.

Before use the gel is deaerated by centrifugation or by evacuation.

One liter of gel is extruded at 6 pounds per square inch pressure through one-eighth inch orifice into a mixture of 3 parts of 28% ammonia and 97 parts of 95% ethanol, volume per volume. The extrusion bath is a mixture of 240 milliliters of reagent grade ammonium hydroxide (28%) diluted to 8000 milliliters with ethanol.

The extruded filament is allowed to remain in the precipitating bath for more than 2 hours, after which the filament is passed through compression rolls to form a ribbon and then over the drying rolls at temperatures of 110 to 120° F. Pressure is increased between each successive compression rolls to remove the solvent and to form a flat ribbon. This ribbon is then dried. Each liter of collagen gel by this procedure, yields a continuous ribbon approximately 425 feet long at the rate of about 6 feet per minute.

The dry ribbon is collected on a reel. As convenient, the reeled ribbon is fed into the spinning process. The ribbon material is successively immersed in a 1.5% ammonium dichromate, 1.5% potassium carbonate aqueous bath, stretched approximately 20% while wet, and then twisted in a tight spiral to produce a smooth cylindrical strand, which is collected on a reel. The ribbon passes through the machine at the rate of about 15 feet per minute. The spun strands are stretched in a humid atmosphere at room temperature until an overall elongation of 30–40% is imposed. The stretched strands are then allowed to dry for 2 hours. The dry strands containing ammonium dichromate are wound on stainless steel drums eight inches in diameter, and immersed for a period of about 3 hours in 5% sodium bisulfite at 20° C. After the chrome has been reduced, which depends upon the cross sectional area, the chromed strands are transferred to a 2% sodium bicarbonate solution and then finally washed an hour in water. They are then wound on pegs under tension to produce straight lengths.

EXAMPLE 6

Beta-Propiolactone Added to Gel

Using the procedure of Example 5 collagen gel was prepared containing 0.5%, 1.5%, and 2.5% of beta-propiolactone on a volume by volume basis. The beta-propiolactone is added after the gel is formed just prior to its passage through the colloid mill. The addition of the beta-propiolactone resulted in slightly slower precipitation in the ammoniacal ethanol bath. The precipitated filament or "noodle" is slightly more stretchable than a noodle prepared in the absence of the beta-propiolactone. Samples of the collagen gel removed from the extrusion bath and tested using a thioglycollate broth show no growth of micro-organisms.

EXAMPLE 7

Beta-Propiolactone Added to Precipitating Bath

Collagen gel is extruded into a precipitating bath containing beta-propiolacetone in concentration ranges of 0.025% to 1.5% and transferred aseptically to fluid thioglycollate medium and incubated at 37° C. for at least 14 days. In the absence of beta-propiolactone such noodles invariably show heavy bacterial growth within the period. When precipitated in the bath containing beta-propiolactone, the wet precipitated collagen is found to cause no bacterial growth in the assay broth.

EXAMPLE 8

Treatment of Dry Ribbon

Samples of dry pressed regenerated collagen ribbon as removed from the final dry rolls using the procedure of Example 5 by an aseptic technique were transferred directly to test tubes. Samples were submitted for microbiological assay to determine micro-organisms present in the ribbon as prepared. The ribbon samples were incubated in sterile thioglycollate broth at 37° C. for 14 days and invariably showed a heavy growth of micro-organisms.

In the spinning process, described in Example 5, two different spinning baths are used; for plain sutures the bath contains 6.3 milliliters of 28% ammonium hydroxide per 1,000 milliliters and 1.1 grams of ammonium chloride. For chromicized sutures, the bath contains 15 grams of ammonium chromate and 15 grams of potassium carbonate per 1,000 milliliters. Tests were run by treating the dry ribbon at three levels of beta-propiolactone: 0.5%, 1.0%, and 2.0%, in each of these two baths. The baths were chilled to 0° C. and cool beta-propiolactone was added thereto. Aliquots of each bath were transferred aseptically to the ribbon samples in sterile cotton-plugged test tubes and held at room temperature for three days. The samples of the ribbon were then transferred aseptically to fluid thioglycollate medium and incubated at 37° C. with the results being as noted below:

TABLE 4

Summary of Microbiological Assays on Air-Dry Regenerated Collagen Ribbon Treated With Beta-Propiolactone in Test Tube Experiments

| Concentration of beta-propiolactone | Bacterial growth observed in thioglycollate broth | |
|---|---|---|
| | Ribbon treated in fluid containing $NH_4OH$ and $NH_4Cl$ | Ribbon treated in fluid containing $(NH_4)_2Cr_2O_7$ and $K_2CO_3$ |
| None | Heavy growth after 1 day | Heavy growth after 1 day. |
| 0.5% | Heavy growth after 2 days | No growth within 14 days. |
| 1.0% | No growth within 14 days | Do. |
| 2.0% | ----do---- | Do. |

EXAMPLE 9

Spinning Bath Sterilization

Spinning baths were prepared containing 5% beta-propiolactone in the spinning bath. Inasmuch as the time of immersion is about two minutes, 5% beta-propiolactone was added to the bath. The temperature was maintained at 0° C. to extend the life of the beta-propiolactone. Suture ribbons being spun were processed in the beta-propiolactone containing solution and then processed to dry finished strands in the conventional manner without aseptic precautions. The strands were cut into sutures and tubed in a 60% isopropanol, 37% ethanol, and 3% water tubing fluid. In certain instances the tubing fluid had beta-propiolactone added to it to control viable organisms that adhered to the strands during later steps of processing. After standing for at least 24 hours at room temperature, the suture samples were transferred aseptically to sterile thioglycollate medium and incubated at 37° C. The results are as shown in the following table:

TABLE 5

Summary of Microbiological Assays on Tubed Regenerated Collagen Sutures Treated With Beta-Propiolactone in the Spinning Bath

| Concentration of beta-propiolactone in tubing fluid | Bacterial growth observed in thioglycollate broth | |
|---|---|---|
| | Ribbon spun from 5% beta-propiolactone bath containing $HN_4OH$ and $NH_4Cl$ | Ribbon spun from 5% beta-propiolactone bath containing $(NH_4)_2CrO_7$ and $K_2CO_3$ |
| none | Bacterial growth in about one-half of the assay tubes, generally within 24 hours. | Bacterial growth in about one-half of the assay tubes, generally within 24 hours. |
| 0.5% | No bacterial growth in 14 days. | No bacterial growth in 14 days. |
| 1.0% | ----do---- | Do. |
| 2.0% | ----do---- | Do. |

In view of the excellent results obtained, the experiment was repeated using a chrome bath, at different beta-propiolactone concentration levels. The results obtained were:

TABLE 6

Summary of Microbiological Assay on Samples of Regenerated Collagen Sutures Spun From Baths Containing Beta-Propiolactone and Tubed in 60:37:3 (Isopropanol: Ethanol: Water) Tubing Fluid

| Concentration of beta-propiolactone in tubing fluid | Concentration of beta-propiolactone in spinning bath | | | |
|---|---|---|---|---|
| | None | 1.25% | 2.50% | 5.00% |
| | Bacterial growth observed in thioglycollate assay broth | | | |
| 0.15% | Heavy growth in all 3 replicates after 6 days. | Heavy growth in one replicate after 4 days; probably contaminated in assay procedure. | No growth in any of 3 replicates in 15 days | No growth in any of 3 replicates in 15 days |
| 0.30% | Heavy growth in all 3 replicates after 4 days. | No growth in any of 3 replicates in 15 days. | do | do |
| 0.45% | Heavy growth in all 3 replicates after 7 days. | do | do | do |

A similar experiment using 2B ethanol (95%) as the tubing fluid showed growth in one of three replicates after 4 days with no beta-propiolactone in the spinning bath at 0.15% beta-propiolactone in the tubing fluid. At 0.30% and 0.45% beta-propiolactone in the tubing fluid, and no beta-propiolactone in the spinning bath and with the beta-propiolactone in the spinning bath, no growth was observed in any of 3 replicates in 15 days.

These results show that the suture is internally sterilized by beta-propiolactone in the spinning bath, and that after acquired surface contamination is easily controlled by adding beta-propiolactone to the tubing fluid.

EXAMPLE 10

Bicarbonate Bath Sterilization

In the processing of sutures as set forth in Example 5, two drums of chromed strands were treated by comparative processes, one in a 2% sodium bicarbonate solution, the other in a 2% sodium bicarbonate containing additionally 2.5% beta-propiolactone added immediately before the suture on the stainless steel drum is put in the bath. In each instance the sutures on the drums remained in the bath for two hours at room temperature, then the suture on the drum was washed with tap water for an hour. The strands were removed from the drum and racked on steel racks to dry as straight lengths of 54–60 inches each for two days in laboratory air. No precautions were taken to prevent surface contamination. The sutures were coiled, placed in sterile test tubes and tubed in a 60% isopropanol, 37% ethanol, 3% water tubing fluid, some of which tubes additionally contained beta-propiolactone. In each instance the suture sample was covered with the fluid. On bacterial analysis by placing samples of the sutures in thioglycolate medium and culturing at 37° C. the following results were obtained:

TABLE 7

Summary of Microbiological Assays on Regenerated Collagen Suture to Show the Effect of Beta-propiolactone in the Sodium Bicarbonate Wash

| Concentration of beta-propiolactone in tubing fluid | Bacterial growth observed in thioglycollate broth | |
|---|---|---|
| | No beta-propiolactone added to the sodium bicarbonate bath | 2.5% beta-propiolactone added to the sodium bicarbonate bath |
| None | Heavy growth after 3 days | Heavy growth after 3 days. Growth in one of two tubes, appeared after 6 days. |
| 0.5% | do | |
| 1.0% | Growth in both tubes, appeared after 7 days. | No growth in 14 days. |
| 2.0% | Growth in both tubes; after 7 days. | Do. |

This test shows that the suture is sterilized in the sodium bicarbonate wash solution containing 2.5% beta-propiolactone and any surface contamination is controlled by adding beta-propiolactone to the tubing fluid.

EXAMPLE 11

Beta-Propiolactone in the Final Wash Water

The procedure as shown in Example 5 was modified to using a final wash water, after the sodium bicarbonate bath, which contained 2.5% beta-propiolactone. After washing for one hour in water containing 2.5% beta-propiolactone the strands were stretched on pegs and allowed to dry without aseptic precaution and then tubed using a 60% isopropanol, 37% ethanol and 3% water tubing fluid to which beta-propiolactone was added in one case. The results of this experiment are shown in the following table:

TABLE 8

Summary of Microbiological Assays on Regenerated Collagen Sutures to Show the Effect of Beta-propiolactone in the Final Water Wash

| Concentration of beta-propiolactone in tubing fluid | Bacterial growth observed in thioglycollate broth | |
|---|---|---|
| | No beta-propiolactone added to the final water wash | 2.5% beta-propiolactone added to the final water wash |
| None | Heavy growth after 3 days. Heavy growth in both duplicates; appeared in 10 and 13 days. | Heavy growth after 3 days. No growth in 14 days. |
| 0.5% | | |

EXAMPLE 12

Beta-Propiolactone in Tubing Fluid

It was found that plain or chromicized regenerated collagen suture strands were not sterilized by adding the sutures to the tubing fluid of 60% isopropanol, 37% ethanol, and 3% water containing up to 2% beta-propiolactone when the suture was added as a dry suture. Apparently, under these conditions, the beta-propiolactone has disappeared before reaching the center of the suture.

However, where the suture strands are pre-conditioned for a week in the same alcoholic tubing fluid before being tubed in the alcohol tubing fluid containing beta-propiolactone, sterile sutures were obtained.

Samples of the pre-conditioned sutures were transferred to fluid thioglycollate medium and incubated at 37° C. showing the following results of duplicate assays:

TABLE 9

Summary of Microbiological Assays on Regenerated Collagen Strands Pre-Conditioned for a Week in Alcoholic Tubing Fluid Before Being Tubed in Alcoholic Fluid With Beta-Propiolactone Added

| Concentration of beta-propiolactone in tubing field | Plain regenerated collagen suture | Chromicized regenerated collagen suture |
|---|---|---|
| None | Heavy growth in both tubes in 2 days. | Heavy growth in both tubes in 2 days. |
| 0.5% | No growth in either tube in 14 days. | No growth in either tube in 14 days. |
| 2.0% | do | Do. |
| 3.5% | do | Do. |

The above examples show that the collagen forming the sutures may be sterilized at any time during processing by using beta-propiolactone. Beta-propiolactone does not retain its efficacy over a long period of time in solutions containing water; which is a big advantage from the standpoint of use because beta-propiolactone is deleterious to the skin and undoubtedly is deleterious to internal tissues. However, the beta-propiolactone decomposes at such a rate that it may be used for sterilization in processing or even in the final tube and disappears completely before the suture would be used.

Beta-propiolactone in 60% isopropanol, 37% ethanol, 3% water tubing fluid, at the 5% added level, at room temperature, drops to 25% of its original concentration in 10 days; 10% in 20 days, and is minimal in 30 days. In 95% ethanol, the drop is to 40% in 10 days; 16% in 20 days, and is minimal after 50 days.

Sutures stored 60 days, then opened, are tested in animals, and found to give tissue reaction apparently identical with sutures which were heat sterilized.

As the beta-propiolactone disappears rapidly, particularly when warm, solutions containing beta-propiolactone must be freshly prepared for use for best results.

We claim:
1. A method of sterilizing surgical suture collagen which comprises immersing the gut from which the sutures are to be made in a water bath having therein about 0.1% to 5.0% by volume of beta-propiolactone, thereby sterilizing the interior of the gut, forming a suture strand from said gut, and sealing the thus formed sutures in a tubing fluid comprising beta-propiolactone.

2. A method of sterilizing collagen for surgical sutures comprising treating the collagen in a gel form with from about 0.025% to 5% by volume of beta-propiolactone thereby destroying contaminating micro-organisms and spinning the gel to form a suture.

3. A method of forming sterile surgical sutures comprising: shredding Achilles tendon of beef, adding about 0.5% by volume of the finished gel of beta-propiolactone, acidifying with hydrochloric acid to a pH of about 3.5, adding water to dilute to about 0.9% by weight collagen solids, while maintaining the pH at about 3.5, and spinning sutures form the sterile gel thus formed.

4. A method of forming sterile surgical sutures which comprises: freezing beef tendon with solid carbon dioxide, shredding the frozen tendon, adding about 200 parts by weight of tendon solid to about 9,000 parts water containing 50 parts of 3-normal hydrochloric acid, diluting to about 10,000 parts total, kneading and permitting to swell, adding an additional about 13,500 parts of cold water, adding between about 0.5% and 2.5% on a volume by volume basis of beta-propiolactone, stirring until homogeneous, passing through a colloid mill while maintaining the temperature below 25° C., de-aerating and extruding into a bath containing 3 parts of 28% ammonia and 97 parts of 95% ethanol, on a volume basis, compressing the extruded filament and drying said filament, treating said filament in a bath of 1.5% ammonium dichromate and 1.5% potassium carbonate in an aqueous bath, stretching while wet, and twisting to produce a surgical suture, additionally stretching to an over-all elongation of about 30% to 40%, drying, immersing in 5% sodium bisulfite for about three hours at 20° C., transferring to a 2% sodium bicarbonate solution, washing for one hour in water, and then winding on pegs to produce straight suture lengths.

5. A method of forming sterile surgical sutures comprising: forming a collagen gel from beef tendon and extruding into a precipitating bath containing between 0.025% and 1.5%, on a volume by volume basis of beta-propiolactone and twisting a suture therefrom.

6. A method of forming sterile surgical sutures comprising: shredding beef tendon, forming a collagen gel therefrom, precipitating the collagen gel in a spinning bath containing about 5% beta-propiolactone at about 0° C., finishing the suture without aseptic precautions, and tubing in a 60% isopropanol, 37% ethanol, 3% water tubing fluid to which additionally is added from about 0.5% to 2% beta-propiolactone, thus sterilizing the sutures in the tubing fluid.

7. A method of forming sterile surgical sutures comprising: shredding beef tendon, forming a collagen gel therefrom, spinning the gel in a bath containing about 5% beta-propiolactone, finishing the spun suture to suture strands, and tubing in a tubing fluid containing 0.15% to 2% beta-propiolactone thereby forming sterile sutures.

8. A method of sterilizing surgical sutures formed of regenerated collagen by shredding collagen, acidifying and dispersing in water to form an aqueous collagen gel, regenerating said gel into strands, and spinning said strands into absorbable sutures which are stored in a water-containing tubing fluid which comprises: treating and thereby destroying micro-organisms present in the collagen by adding to and thereby treating the collagen with an aqueous liquid containing from about 0.5 to 5% by volume of beta-propiolactone based on the volume of the aqueous treating liquid, which liquid contacts the collagen prior to the drying of the sutures, while the collagen is moist and contains water, and hence is readily penetratable by the beta-propiolactone, forming surtures from the strands; and adding beta-propiolactone to the tubing fluid to insure sterility of the final suture.

References Cited in the file of this patent
UNITED STATES PATENTS

| | | |
|---|---|---|
| 2,426,861 | Comolli | Sept. 2, 1947 |
| 2,461,602 | Hollihan | Feb. 15, 1949 |
| 2,475,697 | Cresswell | July 12, 1949 |
| 2,637,321 | Cresswell | May 5, 1953 |
| 2,817,437 | George | Dec. 24, 1957 |

OTHER REFERENCES

Polymers and Resins, by Golding, p. 170 (published by D. Van Nostrand Co., Inc., 1959).

Phillips: Gaseous Sterilization, Feb. 25, 1958, pp. 14–16.

UNITED STATES PATENT OFFICE
CERTIFICATE OF CORRECTION

Patent No. 3,098,696            July 23, 1963

Edwin Lawrence Ball et al.

It is hereby certified that error appears in the above numbered patent requiring correction and that the said Letters Patent should read as corrected below.

Column 3, line 12, for "somewater" read -- some water --; lines 35 and 36, for "accomplised" read -- accomplished --; column 4, line 11, for "use" read -- used --; column 7, line 18, for "ceres", in italics, read -- cereus --, in italics; column 10, TABLE 5, second column, line 4 of the sub-heading, for "HN$_4$OH" read -- NH$_4$OH --; column 12, TABLE 9, first column, line 4 of the heading, for "field" read -- fluid --; column 13, line 43, for "form" read -- from --; column 14, line 42, for "surtures" read -- sutures --.

Signed and sealed this 11th day of February 1964.

(SEAL)
Attest:

ERNEST W. SWIDER
Attesting Officer

EDWIN L. REYNOLDS
Acting Commissioner of Patents